United States Patent
Hendriks et al.

(10) Patent No.: US 7,924,140 B2
(45) Date of Patent: Apr. 12, 2011

(54) BIOMETRICS-BASED IDENTIFICATION METHOD AND APPARATUS

(75) Inventors: Robert Frans Maria Hendriks, Eindhoven (NL); Wouter Harry Jacinth Rensen, Eindhoven (NL); Antonius Hermanus Maria Akkermans, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1024 days.

(21) Appl. No.: 11/577,375

(22) PCT Filed: Oct. 20, 2005

(86) PCT No.: PCT/IB2005/053445
§ 371 (c)(1),
(2), (4) Date: Apr. 17, 2007

(87) PCT Pub. No.: WO2006/043252
PCT Pub. Date: Apr. 27, 2006

(65) Prior Publication Data
US 2008/0157921 A1    Jul. 3, 2008

(30) Foreign Application Priority Data
Oct. 22, 2004    (EP) .................................. 04300711

(51) Int. Cl.
*G05B 19/00* (2006.01)
(52) U.S. Cl. ....... 340/5.83; 340/5.53; 382/116; 382/124
(58) Field of Classification Search .................. 340/5.83, 340/5.53; 382/115, 116, 124
See application file for complete search history.

(56) References Cited

U.S. PATENT DOCUMENTS

| 5,935,071 A | 8/1999 | Schneider et al. |
| 6,363,485 B1 | 3/2002 | Adams et al. |
| 6,411,933 B1 | 6/2002 | Maes et al. |
| 6,572,014 B1 | 6/2003 | Lambert |

(Continued)

FOREIGN PATENT DOCUMENTS

| DE | 10128717 | 12/2002 |
| EP | 1353292 | 10/2003 |
| EP | 1524621 | 4/2005 |
| JP | 10295674 | 11/1998 |
| WO | 0305650 A1 | 7/2003 |

OTHER PUBLICATIONS

Schmitt R M et al; "Ultrasonic Imaging of Fingerprints", Ultrasonics Symposium, 2004 IEEE Montreal, pp. 680-688, 2004, XP010784035.

(Continued)

*Primary Examiner* — Edwin C Holloway, III
(74) *Attorney, Agent, or Firm* — Larry Liberchuk

(57) ABSTRACT

The invention relates to an identification method carried out as follows. A surface structure and an inner structure of a body member are measured (ST1-ST4, ST7) so as to obtain a surface-structure measurement result (FPM) and an inner-structure measurement result (BVPM), respectively. The surface-structure measurement result (FPM) is compared (ST5) with a surface-structure reference result (FPR) that distinguishes an individual from other individuals. The inner-structure measurement result (BVPM) is compared (ST8) with an inner-structure reference result (BVPR) that is associated with the same individual and that distinguishes the individual from other individuals. The body member may be, for example, a finger. In that case, the surface structure comprises a fingerprint and the inner structure comprises a blood-vessel pattern.

9 Claims, 7 Drawing Sheets

U.S. PATENT DOCUMENTS

| | | |
|---|---|---|
| 6,672,512 B2 | 1/2004 | Bridgelall |
| 6,898,299 B1 * | 5/2005 | Brooks .......................... 382/115 |
| 2002/0048014 A1 | 4/2002 | Kono et al. |
| 2002/0076089 A1 | 6/2002 | Muramatsu et al. |
| 2003/0016345 A1 | 1/2003 | Nagasaka et al. |
| 2004/0179723 A1 | 9/2004 | Sano et al. |
| 2004/0184641 A1 | 9/2004 | Nagasaka et al. |

OTHER PUBLICATIONS

Peter Ferentinos, B; "Application of Biometric Technology", Memory Experts International Inc, 2003.

Peter Biship; "Atmel's Fingerchip™ Technology", Atmel White Paper.

Patricia A Wittich; "Biometrics: Are You the Key to Security?", Sans Institute, 2003.

Paul Skokowski; "Can Biometrics Defeat Terror?" Stanford University, 2002.

Stephanie Schukers, Ph.D: "Spoofing and Anti-Spoofing Measures", Information Security Technical Report, vol. 7, No. 4, pp. 56-62, 2002.

Ton Van Der Putte; "Spoofing Fingerprints", Atos Origin, Biometrics 2001.

* cited by examiner

| | | | |
|---|---|---|---|
| 1 | ID1 | FPR1 | BVPR1 |
| 2 | ID2 | FPR2 | BVPR2 |
| 3 | ID3 | FPR3 | BVPR3 |
| 4 | ID4 | FPR4 | BVPR4 |
| | | | |

DB        Identity Data     Fingerprint Reference     Blood-vessel Pattern Reference

FIG. 2

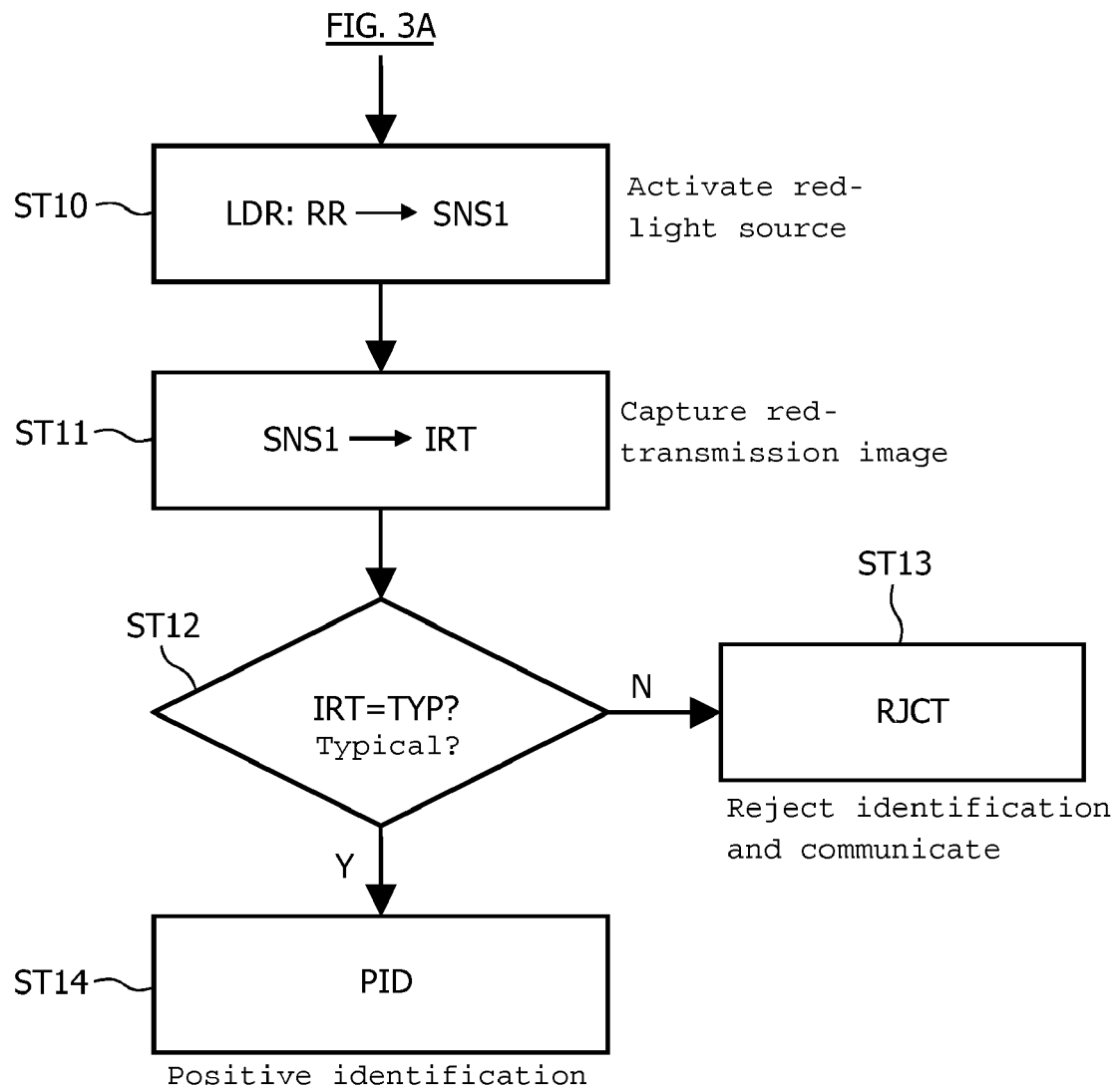

BIOMETRICS-BASED IDENTIFICATION METHOD AND APPARATUS

FIELD OF THE INVENTION

The invention relates to a method of identification that is based on biometric features. This method of identification may include, for example, a fingerprint measurement followed by a fingerprint comparison so as to identify a particular individual. Such a method can also be used to ascertain that a particular individual truly is who she or he claims to be. The latter is often referred to as authentication. Other aspects of the invention relate to an identification apparatus, an identification system and a computer-program product for an identification apparatus.

DESCRIPTION OF PRIOR ART

European patent application published under number EP 1 353 292 describes an optical biometric sensor apparatus for analyzing images of fingerprints. Live body members are detected by transmitting infrared light from an infrared light source to an image sensor. The infrared transmission characteristics of a live body member vary with the human heartbeat. Multiple images are analyzed to verify whether the object is a genuine live body member.

SUMMARY OF THE INVENTION

According to an aspect of the invention, identification is carried out as follows. A surface structure and an inner structure of a body member are measured so as to obtain a surface-structure measurement result and an inner-structure measurement result, respectively. The surface-structure measurement result is compared with a surface-structure reference result that distinguishes an individual from other individuals. The inner-structure measurement result is compared with an inner-structure reference result that is associated with the same individual and that distinguishes the individual from other individuals.

The invention takes the following aspects into consideration. A surface structure of a body member, such as, for example, a fingerprint can relatively easily be faked. For example, a fake fingerprint can be created from a fingerprint left on a clean glass or another object. The fingerprint can be copied onto a dummy finger made of, for example, rubber. The dummy finger with the copied fingerprint can then be presented to an identification apparatus based on fingerprint recognition. Accordingly, the identification apparatus can be fooled.

Various techniques can be applied to make an identification apparatus more fraud resistant. One technique is to carry out a so-called liveliness detection so as to distinguish a dummy finger from a live human finger. The liveliness detection may be based on, for example, temperature, presence of blood or blood flow, or presence of a human heartbeat. The aforementioned prior art is an example of the latter. However, an identification apparatus with such liveliness detection remains vulnerable. The identification apparatus can still be fooled by means of, for example, a fingerprint copy that is placed on a finger of an arbitrary individual. Another technique is to measure electrical characteristics between features of a fingerprint. Dummy fingers and dead fingers do not have the same electrical characteristics as live fingers. Such a technique can distinguish between a genuine fingerprint and a fingerprint copy that is placed on the finger of arbitrary individual.

However, an identification apparatus will still be relatively sensitive to fraud even if one or more of the aforementioned techniques are applied. The fundamental reason for this is that none of the aforementioned characteristics, which are measured in addition to fingerprints, is unique. Every human being has a body temperature of approximately 37°. Blood flows through the finger of every living human being. Every human being has a heartbeat, etc. Consequently, an identification apparatus can still be relatively easily fooled despite the aforementioned techniques. It is sufficient to simulate the one or more relevant characteristics that are measured with sufficient precision so that these characteristics resemble those of a living human being.

In accordance with the aforementioned aspect of the invention, two respective measurements and comparisons are made. The surface-structure measurement result is compared with the surface-structure reference result that distinguishes an individual from other individuals. In addition, the inner-structure measurement result is compared with the inner-structure reference result that is associated with the same individual and that distinguishes her or him from other individuals. The body member may be, for example, a finger. In that case, the surface structure comprises a fingerprint and the inner structure comprises a blood-vessel pattern.

Let it be assumed that a fraudulent person attempts to fool an identification apparatus based on fingerprint recognition. The fraudulent person places a fingerprint copy on one of his fingers. Moreover, the fingerprint copy has electrical characteristics and other characteristics similar to those of a live finger skin. A prior art identification apparatus will most likely be fooled.

However, there is little chance that an identification apparatus in accordance with the invention will be fooled. The fraudulent person's finger will most likely have a blood-vessel pattern that is quite different from the blood-vessel pattern of the individual's finger to whom the fingerprint belongs. The identification apparatus will compare the blood-vessel pattern of the fraudulent person with the reference blood-vessel pattern that belongs to the individual whose fingerprint the fraudulent person fakes. It is most likely that there is an insufficient match between these two blood-vessel patterns. The fraudulent person has failed to fool the identification apparatus in accordance with the invention. This example illustrates that the invention allows relatively reliable identification and authentication.

Another advantage of the invention relates to the following aspects. In principle, it is possible to carry out identification based on an inner structure of a body member only. However, such identification is relatively unreliable for the following reasons. The inner structure of a body member, such as, for example, a blood-vessel pattern, generally has a relatively modest distinctive power. That is, it is difficult to uniquely distinguish a blood-vessel pattern of an individual from respective blood-vessel patterns of many other individuals. Consequently, it requires relatively complicated hardware or software, or both, in order to guarantee that a measured blood-vessel pattern can match with a single reference blood-vessel pattern only. It may even prove to be impossible to achieve the aforementioned.

In accordance with the invention, a surface and an inner structure are respectively measured and compared with reference results. The surface structure, such as, for example, a fingerprint has relatively great distinctive power. This distinctive power can compensate for a modest distinctive power of the inner structure, such as, for example, a blood-vessel pattern. The invention does not require that a measured blood-vessel pattern matches with a single reference blood-vessel pattern only. Consequently, reliable identification and authentication can be achieved with relatively simple hardware and software. For those reasons, the invention allows cost-efficient implementations.

These and other aspects of the invention will be described in greater detail hereinafter with reference to drawings.

BRIEF DESCRIPTION OF THE DRAWINGS

FIG. 2 is a block diagram that illustrates a database that forms part of the identification system.

FIGS. 3A and 3B are flow-chart diagrams that illustrate operations that the identification system carries out.

DETAILED DESCRIPTION

Figure 1:
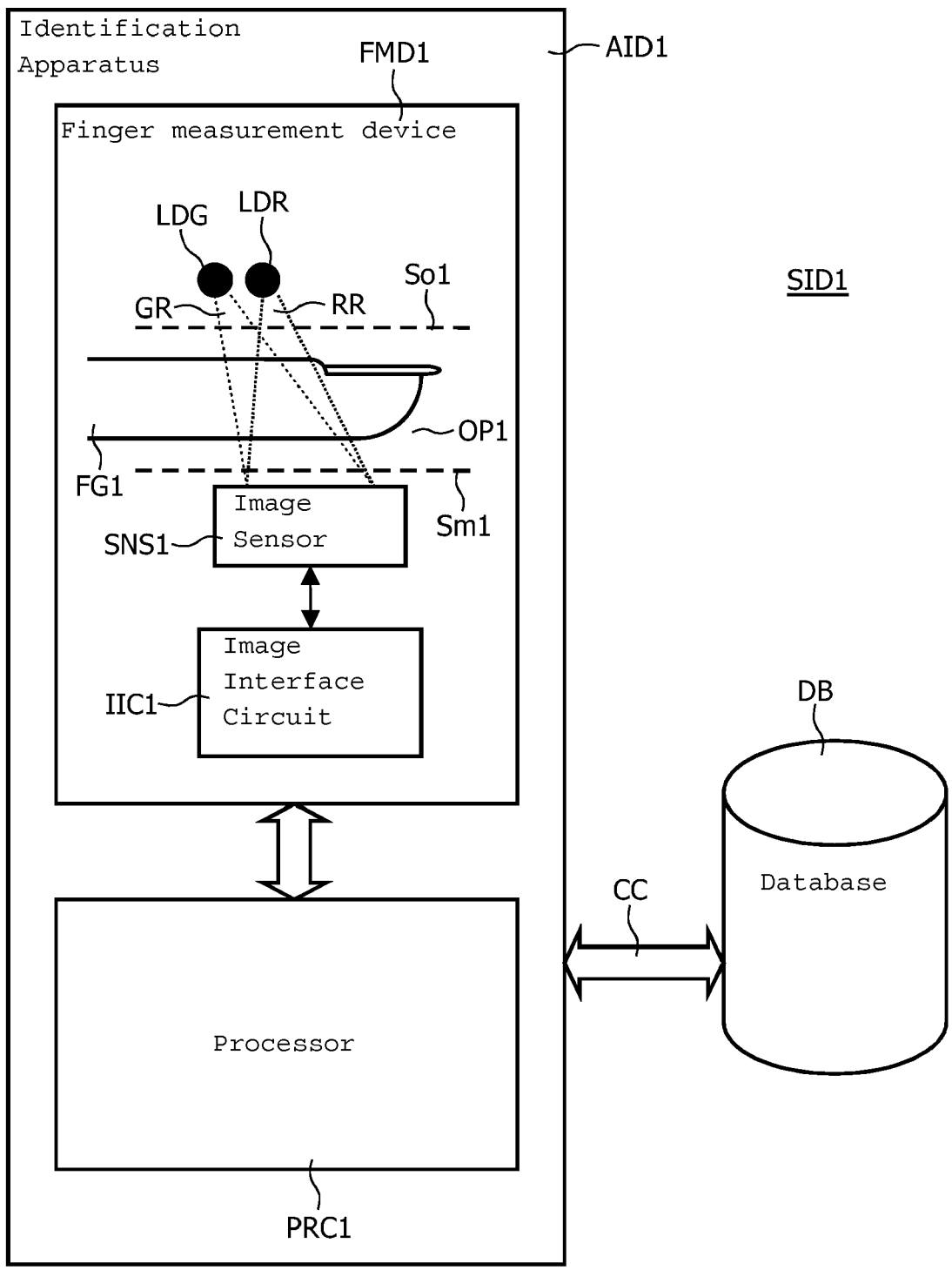
FIG. 1 is a block diagram that illustrates an identification system.

FIG. 1 illustrates an identification system SID1 which comprises an identification apparatus AID1 and a database DB exchanging data via a communication channel CC. The identification apparatus AID1 itself comprises a finger measurement device FMD1 and a processor PRC1. The finger measurement device FMD1 comprises an opening OP1 for receiving a finger FG1, a red-light source LDR, a green-light source LDG, an image sensor SNS1, and an image interface circuit IIC1. The image sensor SNS1 is located on a measurement side Sm1 of the opening OP1. The red-light source LDR and the green-light source LDG are located on an opposite side So1 of the opening OP1. The red-light source LDR and the green-light source LDG may be in the form of, for example, one or more light emitting diodes. The processor PRC1 may be in the form of, for example, a suitably programmed circuit. The processor PRC1 will typically comprise a program memory that comprises instructions, i.e. software, and one or more processing units that execute these instructions, which causes data to be modified or transferred or both.

FIG. 2 illustrates the database DB of the identification system SID1 in the form of a table. A row illustrates an entry of the database DB. An entry comprises a set of characteristics for a particular individual. A column represents a particular characteristic. FIG. 2 illustrates four entries for individuals designated with numerals 1, 2, 3, and 4, respectively. Each of these entries comprises identity data ID, fingerprint reference data FPR and blood-vessel pattern reference data BVPR. For example, the database entry for individual 1 comprises the individual's identity data ID1, the individual's fingerprint reference data FPR1 and the individual's blood-vessel pattern reference data BVPR1. The same applies for individuals 2, 3, and 4 and other individuals for which the database DB comprises an entry. The identity data ID may comprise, for example, the individual's name, date of birth, and domicile.

The fingerprint reference data FPR of an individual uniquely distinguishes the individual from any other individual for which there is an entry in the database DB. For example, there is no other individual that has fingerprint reference data identical to the fingerprint reference data FPR1 for the individual 1. The fingerprint reference data FPR may result from, for example, a so-called minutiae extraction. A fingerprint is characterized by gross features and fine features called minutiae. Bifurcations, Y-shaped junctions and terminations of ridges constitute minutiae. Typically, between 30 and 40 minutiae are present in a fingerprint. Each of these is characterized by its position, type (bifurcation, junction or termination) and orientation. The probability of two different fingerprints having identical minutiae is extremely low.

The blood-vessel pattern reference data BVPR also distinguishes an individual from other individuals for which there is an entry in the database DB. In general, blood-vessel patterns have less distinctive power compared with fingerprints. Accordingly, the blood-vessel pattern reference data BVPR1 need not necessarily uniquely distinguish the individual 1 from other individuals, although this is preferred. One or more other individuals may have blood-vessel pattern reference data that is identical to the blood-vessel pattern reference data BVPR1 for the individual 1. The blood-vessel pattern reference data BVPR may result from, for example, an extraction of characteristic features comparable with the minutiae extraction for fingerprints.

Figure 3A:
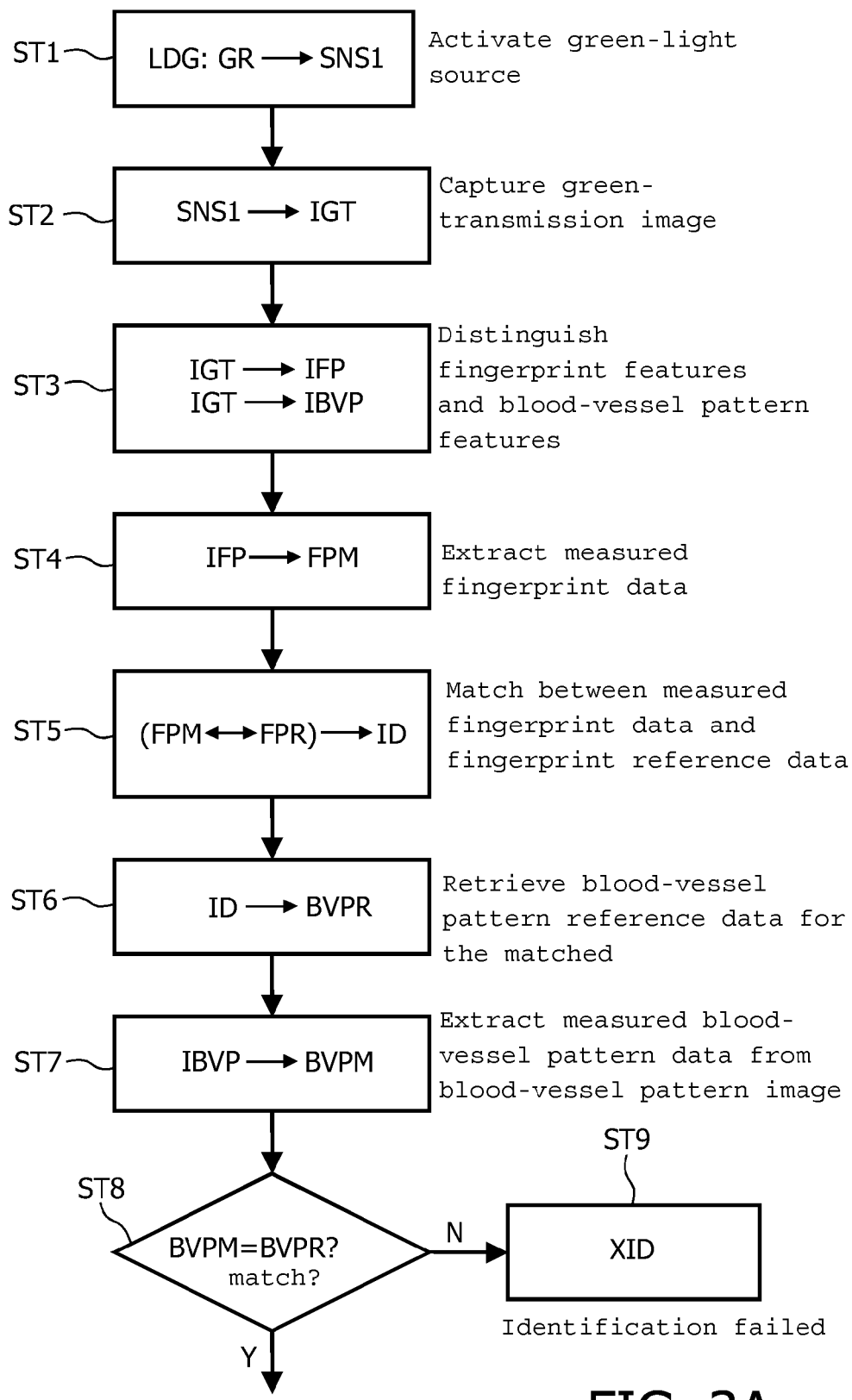

FIGS. 3A and 3B illustrate operations that the identification system SID1 carries out. The operations are illustrated in the form of a series of steps ST1-ST14. FIG. 3A illustrates steps ST1-ST9. FIG. 3B illustrates steps ST10-ST14. The illustrated operations are typically carried out under the control of the processor PRC1 by means of suitable software. For example, the processor PRC1 may send control signals to the finger measurement device FMD1 so as to cause the finger measurement device FMD1 to carry out a certain step.

In step ST1, the processor PRC1 activates the green-light source LDG, which produces a green-light radiation GR. FIG. 1 illustrates this. The green-light radiation GR preferably has a wavelength of approximately 532 nanometers. The green-light radiation GR traverses at least a portion of the finger FG1 on which fingerprints are present (LDG: GR→SNS1). Blood-vessels within the finger FG1 substantially absorb the green-light radiation GR.

In step ST2, the image sensor SNS1 captures a green-transmission image IGT based on the green-light radiation GR that has traversed the finger FG1 (SNS1→IGT). The finger measurement device FMD1 transfers the green-transmission image IGT to the processor PRC1 via the image interface circuit IIC1.

In step ST3, the processor PRC1 distinguishes between fingerprint features and blood-vessel pattern features in the green-transmission image IGT. Accordingly, the processor PRC1 extracts a fingerprint image IFP from the green-transmission image IGT (IGT→IFP). The fingerprint image IFP substantially comprises the fingerprint features only. The processor PRC1 further extracts a blood-vessel pattern image IBVP from the green-transmission image IGT (IGT→IBVP). The blood-vessel pattern image IBVP substantially comprises the blood-vessel pattern features only.

In step ST4, the processor PRC1 extracts measured fingerprint data FPM from the fingerprint image IFP (IFP→FPM). This extraction may be similar to the minutiae extraction that was used to obtain the fingerprint reference data FPR illustrated in FIG. 2. Accordingly, the measured fingerprint data FPM comprises position, type and orientation of respective minutiae in the fingerprint image IFP.

In step ST5, the processor PRC1 searches for a match between the measured fingerprint data FPM and a fingerprint reference data FPR, which is present in the database DB illustrated in FIG. 2 ([FPM↔FPR]→ID). The match needs not necessarily to be perfect: a certain error, which is relatively small, can be tolerated. The error that can be tolerated will vary from one application to another depending on, for example, a typical accuracy of the fingerprint measurement device FMD1 and a level of security that is required.

In step ST5, the processor PRC1 may search through the entire database DB in order to find a match. Alternatively, the processor PRC1 may search through a particular set of entries in the database DB. For example, the processor PRC1 may receive auxiliary information, which allows the processor PRC1 to limit its search. Such auxiliary information may relate to, for example, various groups of individuals, such as, for example, doctors, nurses or clerical staff. Let it be assumed that the finger FG1, which is illustrated in FIG. 1, belongs to an individual who is a doctor. The individual can inform the identification apparatus AID1 that he or she is a doctor by typing on an appropriate button or an appropriate sequence of buttons. Accordingly, the processor PRC1 can limit its search to entries for doctors.

It is also possible that the aforementioned auxiliary information comprises identity data that uniquely distinguishes the individual from other individuals. In that case, the processor PRC1 does not need to carry out a search but can directly access the entry in the database DB that corresponds to the individual concerned. The processor PRC1 subsequently checks whether the measured fingerprint data FPM corresponds with the fingerprint reference data FPR of the entry. In that case, the identification apparatus AID1 carries out an authentication.

Let it be assumed that the processor PRC1 finds no match between the measured fingerprint data FPM and any fingerprint reference data FPR. In that case, the processor PRC1 may cause a display device to inform the relevant person that the fingerprint is not recognized. Other courses of action are also possible either alone or in combination. For example, an alarm may go off if the processor PRC1 has consecutively carried out step ST5 a predefined number of times without finding any match. An unauthorized person may want to gain access to a certain facility. It is assumed hereinafter that the processor PRC1 finds the fingerprint reference data FPR that matches the measured fingerprint data FPM.

In step ST6, the processor PRC1 retrieves the blood-vessel pattern reference data BVPR of the entry for which there is a fingerprint match (ID→BVPR). In step ST7, the processor PRC1 extracts measured blood-vessel pattern data BVPM from the blood-vessel pattern image IBVP (IBVP→BVPM). This extraction may be similar to the extraction that was used to obtain the blood-vessel pattern reference data BVPR illustrated in FIG. 2.

In step ST8, the processor PRC1 compares the measured blood-vessel pattern data BVPM with the blood-vessel pattern reference data BVPR from the database DB (BVPM=BVPR?). Let it be assumed that the processor PRC1 establishes that the two aforementioned data do not sufficiently match (output N). In that case, the processor PRC1 communicates that identification has failed in step ST9 (XID). The processor PRC1 may take or initiate further action. For example, the processor PRC1 may allow a retry of identification, in which case the processor PRC1 returns to step ST1. The processor PRC1 may send an alarm if, at step ST8, the retry fails too. It will be assumed hereinafter in that the measured blood-vessel pattern data BVPM sufficiently matches the blood-vessel pattern reference data BVPR (output Y).

In step ST10, which is illustrated in FIG. 3B, the processor PRC1 activates the red-light source LDR, which produces a red-light radiation RR. FIG. 1 illustrates this. The red-light radiation RR has a wavelength of approximately 630 nanometers. The red-light radiation RR traverses at least a portion of the finger FG1 on which fingerprints are present (LDR: RR→SNS1). Blood-vessels will absorb the red-light radiation RR to a substantially lesser extent compared with the green-light radiation GR.

In step ST11, the image sensor SNS1 captures a red-transmission image IRT based on the red-light radiation RR that has traversed the finger FG1 (SNS1→IRT). The finger measurement device FMD1 transfers the red-transmission image IRT to the processor PRC1 via the image interface circuit IIC1.

In step ST12, the processor PRC1 verifies whether the red-transmission image IRT is typical for a human finger or not (IRT=TYP?). For example, the red-transmission image IRT should not show blood vessels as clearly as the green-transmission image IGT does. This is because blood vessels absorb the red-light radiation RR to a substantially lesser extent than the green-light radiation GR. The processor PRC1 can thus verify whether a genuine blood-vessel pattern is present or not, by comparing the red-transmission image IRT with the green-transmission image IGT. Let it be assumed that the red-transmission image IRT is not typical for a human finger (output N). In step ST13, the processor PRC1 rejects the identification and communicates the same (RJCT). For example, the processor PRC1 may send an alarm because someone is probably trying to fake a human finger.

In step ST14, the processor PRC1 establishes a positive identification if the red-transmission image IRT comprises sufficient features that are typical for a human finger (PID). The positive identification is further subject to two conditions, which have been described hereinbefore. One condition is that, in step ST5, a match has been found between the measured fingerprint data FPM and a fingerprint reference data FPR in the database DB. Another condition is that, in step ST8, the measured blood-vessel pattern data BVPM corresponds with the blood-vessel pattern reference data BVPR that is associated with the fingerprint reference data FPR.

In the series of steps described hereinbefore, the processor PRC1 interrogates the database DB via the communication channel CC. That is, fingerprint reference data FPR and blood-vessel pattern reference data BVPR transit over the communication channel CC. This data is confidential. For that reason, fingerprint reference data FPR and blood-vessel pattern reference data BVPR are preferably secured by means of, for example, encryption techniques.

Figure 4:
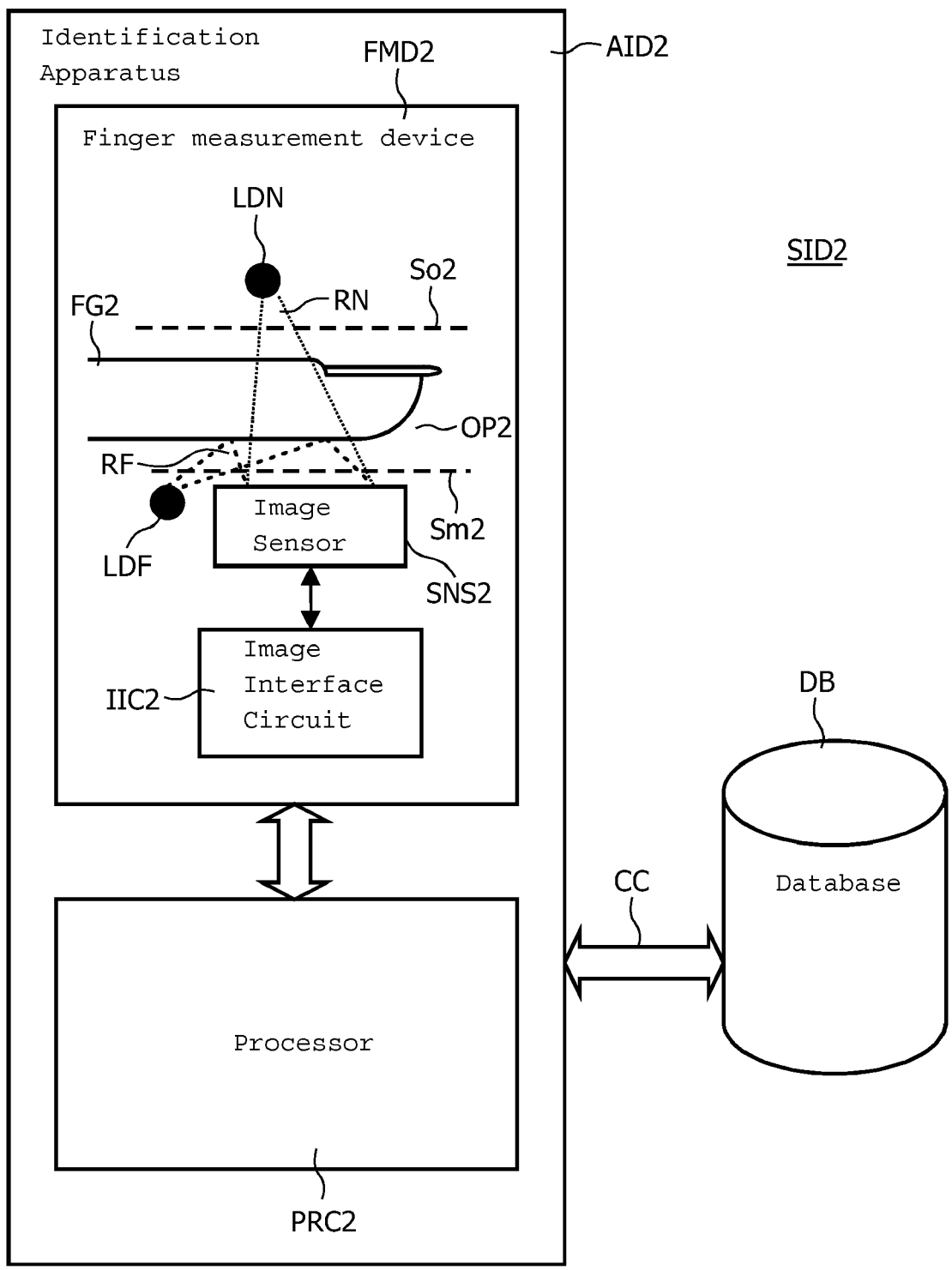
FIG. 4 is a block diagram that illustrates an alternative identification system.

FIG. 4 illustrates an alternative identification system SID2. The alternative identification system SID2 comprises an alternative identification apparatus AID2. The database DB and the communication channel CC are the same as in the identification system SID1 illustrated in FIG. 1. The alternative identification apparatus AID2 comprises an alternative finger measurement device FMD2 and an alternative processor PRC2.

The alternative finger measurement device FMD2 comprises an opening OP2 for receiving a finger FG2, a nail-side radiation source LDN, a fingerprint-side radiation source LDF, an image sensor SNS2, and an image interface circuit IIC2. The image sensor SNS2 is located on a measurement side Sm2 of the opening OP2. The fingerprint-side radiation source LDF is also located on the measurement side Sm2 of the opening OP2. The nail-side radiation source LDN is located on an opposite side So2 of the opening OP2.

The alternative processor PRC2 and the processor PRC1 illustrated in FIG. 1 may be identical in terms of hardware, but are different in terms of software. That is, the software in the alternative processor PRC2 causes the alternative identification apparatus AID2 to carry out operations that are different from the operations illustrated in FIGS. 3A and 3B.

Figure 5A:
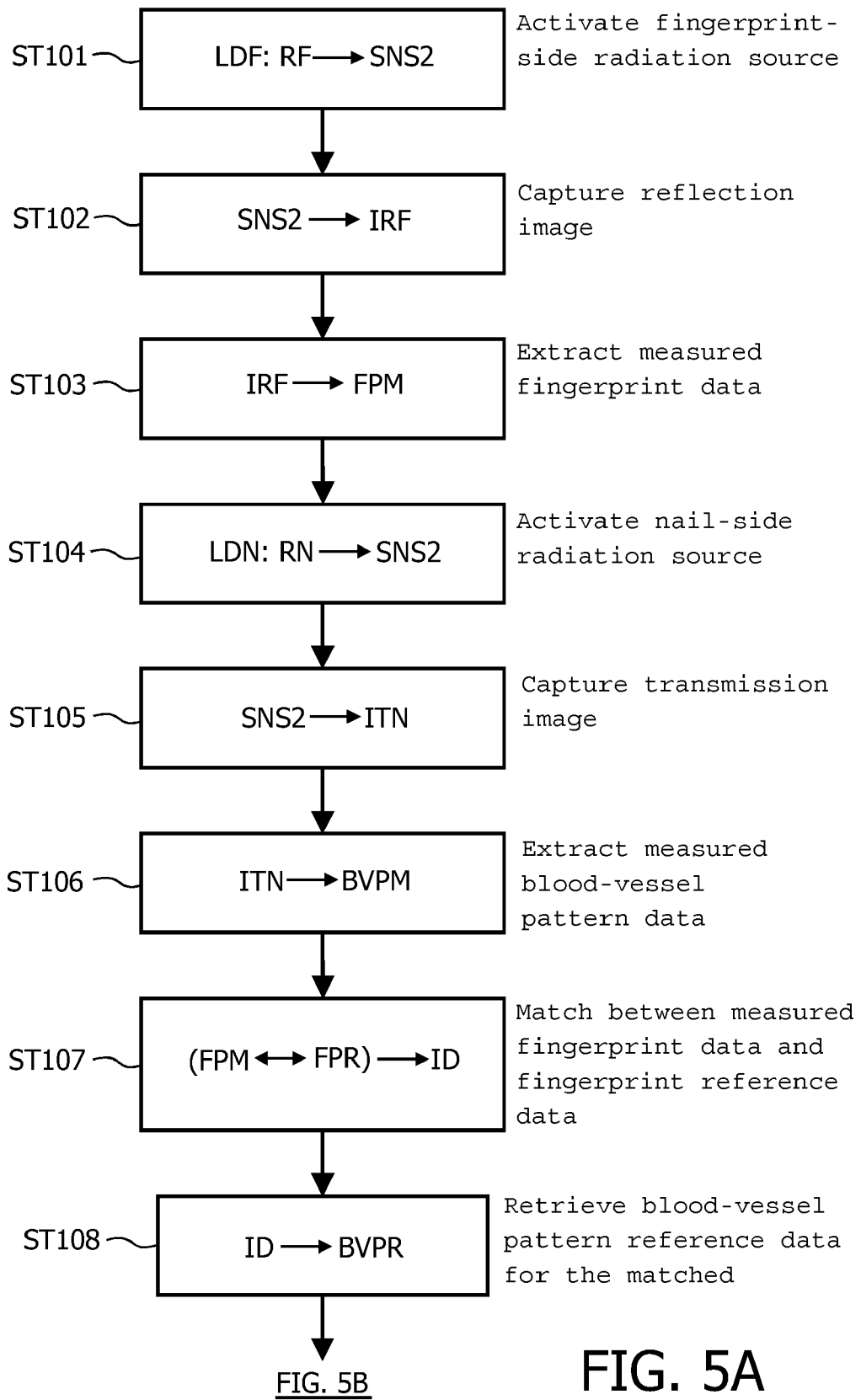
FIGS. 5A and 5B are flow-chart diagrams that illustrate operations that the alternative identification system carries out.
Figure 5B:
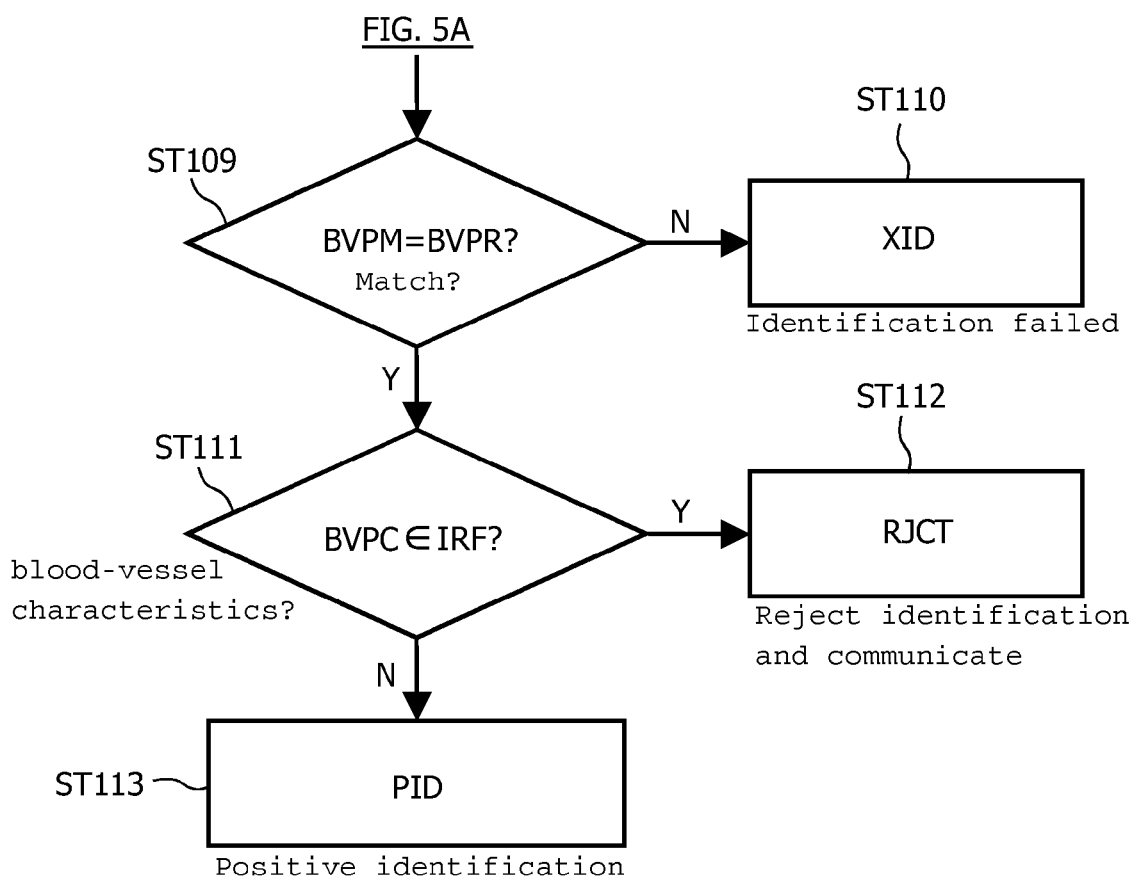

FIGS. 5A and 5B illustrate operations that the alternative identification system SID2 carries out. The operations are illustrated in the form of a series of steps ST101-ST113. FIG. 5A illustrates steps ST101-ST108. FIG. 5B illustrates steps ST109-ST113. The operations thus illustrated are typically carried out under the control of the alternative processor PRC2 by means of a suitable computer program. FIGS. 5A and 5B thus illustrate that the software for the alternative identification system SID2 is different from the software for the identification system SID1 illustrated in FIG. 1.

In step ST101, the alternative processor PRC2 activates the fingerprint-side radiation source LDF, which produces a fingerprint-side radiation RF. FIG. 4 illustrates this. The fingerprint-side radiation RF arrives, at least partially, at a portion of the finger FG2 on which fingerprints are present. The fingerprint-side radiation RF arrives at an angle so that at least a portion of the fingerprint-side radiation RF is reflected (LDF: RF→SNS2).

In step ST102, the image sensor SNS2 captures a reflection image IRF based on the fingerprint-side radiation RF that has reflected from the portion of the finger FG2 on which fingerprints are present (SNS2→IRF). The alternative finger measurement device FMD2 transfers the reflection image IRF to the alternative processor PRC2 via the image interface circuit IIC2. The reflection image IRF comprises fingerprint features.

In step ST103, the alternative processor PRC2 extracts measured fingerprint data FPM from the reflection image IRF (IRF→FPM). This extraction may be similar to the minutiae extraction that was used to obtain the fingerprint reference data, which is stored in the database DB. Accordingly, the measured fingerprint data FPM comprises position, type and orientation of respective minutiae in the reflection image IRF.

In step ST104, the alternative processor PRC2 activates the nail-side radiation source LDN, which produces a nail-side radiation RN. FIG. 4 illustrates this. The nail-side radiation RN traverses the finger FG2 (LDN: RN→SNS2). In step ST105, the image sensor SNS2 captures a transmission image ITN based on the nail-side radiation RN that has traversed the finger FG2 (SNS2→ITN). The alternative finger measurement device FMD2 transfers the transmission image ITN to the processor PRC1 via the image interface circuit IIC2.

In step ST106, the alternative processor PRC2 extracts measured blood-vessel pattern data BVPM from the transmission image ITN (ITN→BVPM). This extraction may be similar to the extraction that was used to obtain the blood-vessel pattern reference data, which is stored in the database DB.

In step ST107, the alternative processor PRC2 searches for a match between the measured fingerprint data FPM and a fingerprint reference data FPR, which is present in the database DB illustrated in FIG. 2 ([FPM↔FPR]→ID). The remarks that were made hereinbefore with the reference to step ST5, equally apply to step ST107. It is assumed that the alternative processor PRC2 finds a fingerprint reference data FPR that matches the measured fingerprint data FPM. In step ST108, the alternative processor PRC2 then retrieves the blood-vessel pattern reference data BVPR of the entry for which there is a fingerprint match (ID→BVPR).

In step ST109, which is illustrated in FIG. 5B, the alternative processor PRC2 compares the measured blood-vessel pattern data BVPM with the blood-vessel pattern reference data BVPR from the database DB (BVPM=BVPR?). The processor PRC1 carries out step ST110 if the aforementioned data insufficiently match (output N). In step ST110, the processor PRC1 communicates that identification has failed (XID). The remarks that were made hereinbefore with the reference to step ST9, equally apply to step ST110. It will be assumed hereinafter in that the measured blood-vessel pattern data BVPM sufficiently matches the blood-vessel pattern reference data BVPR (output Y).

In step ST111, the alternative processor PRC2 verifies whether the reflection image IRF clearly comprises blood-vessel pattern characteristics or not (BVPC∈IRF?). Normally, the reflection image IRF should not (output N) comprise blood-vessel pattern characteristics or, at least, any blood-vessel pattern characteristics should not be clear. Someone is probably trying to fake a human finger if blood-vessel pattern characteristics are clearly present in the reflection image IRF. In that case, the processor PRC1 rejects the identification (output Y) and communicates the same in step ST112, for example, by triggering an alarm (RJCT).

In step ST113, the processor PRC1 establishes a positive identification if the reflection image IRF is sufficiently free from blood-vessel pattern characteristics (PID). The positive identification is further subject to two conditions, which have been described hereinbefore in connection with FIGS. 5A and 5B. One condition is that, in step ST107, a match has been found between the measured fingerprint data FPM and a fingerprint reference data FPR in the database DB. Another condition is that, in step ST109, the measured blood-vessel pattern data BVPM corresponds with the blood-vessel pattern reference data BVPR that is associated with the fingerprint reference data.

Concluding Remarks

The detailed description hereinbefore with reference to the drawings illustrates the following characteristics. A surface structure and an inner structure of a body member (FIG. 1: finger FG1; FIG. 4: finger FG2) are measured (this is done in steps ST1-ST4 and ST7, FIG. 3A, and in steps ST101-106, FIG. 5A). Accordingly, a surface-structure measurement result (measured fingerprint data FPM) and an inner-structure measurement result (measured blood-vessel pattern data BVPM), respectively, are obtained. The surface-structure measurement result is compared with a surface-structure reference result (fingerprint reference data FPR) that distinguishes an individual from other individuals (this is done in step ST5, FIG. 3A and in step ST107, FIG. 5A). The inner-structure measurement result is compared with an inner-structure reference result (blood-vessel pattern reference data BVPR) that is associated with the same individual and that distinguishes the individual from other individuals (this is done in step ST8, FIG. 3A, and in step ST109, FIG. 5B).

The detailed description hereinbefore further illustrates the following optional characteristics (FIGS. 1, 3A and 3B). The surface structure and the inner structure of the body member (finger FG1) are measured by means of a radiation (green-light radiation GR) that traverses the body member so as to obtain a transmission image (green-transmission image IGT) of the body member. Accordingly, implementations require a single radiation source only, which is generally cost-efficient.

The detailed description hereinbefore further illustrates the following optional characteristics (FIGS. 1, 3A and 3B). A verification image (red-transmission image IRT) is formed by means of a further radiation (red-light radiation RR) that traverses an object that should normally be the body member (this is done in steps ST10 and ST11). The verification image is analyzed so as to ascertain that the verification image is typical for body members of the type concerned (this is done in step ST13). Accordingly, a fake body member will most likely be detected. Fraud becomes even more difficult.

The detailed description hereinbefore further illustrates the following optional characteristics (FIGS. 4, 5A and 5B). The surface structure of the body member (finger FG2) is measured by means of a radiation (fingerprint-side radiation RF) that is reflected from a surface of the body-member so as to obtain a reflection image (IRF). The inner structure of the body member is measured by means of a further radiation (nail-side radiation RN) that traverses the body member so as to obtain a transmission image (ITN). Accordingly, two distinct images are obtained: one showing the surface structure and another showing the inner structure. This allows implementations with relatively simple software compared with implementations in which the aforementioned structures are present in a single image and need to be separated.

The detailed description hereinbefore further illustrates the following optional characteristics (FIGS. 4, 5A and 5B). The reflection image (IRF) is analyzed so as to ascertain that the reflection image is sufficiently free of inner-structure features (this is done in step ST111). Accordingly, a fake body member will most likely be detected. Fraud becomes even more difficult.

The aforementioned characteristics can be implemented in numerous different manners. In order to illustrate this, some alternatives are briefly indicated. There are numerous different body members that can be used for identification. A finger is merely an example. Identification may equally be based on, for example, a person's face or eyes. In the case of identification based on a person's face, the surface structure that is measured may comprise facial features that are externally visible. The inner structure that is measured may comprise blood-vessel patterns, bone structure, or features of one or more internal organs, or any combination of those. In the case of identification based on a person's eye, the surface structure that is measured may comprise iris features. The inner structure that is measured may comprise blood-vessel patterns.

There are numerous different manners for measuring the surface structure and the inner structure of a body member. Light is merely an example. Ultrasound or X-ray radiation may equally be used. Various different wavelengths may be used. For example, in the identification system SID1, which is illustrated in FIG. 1, the green-light source LDG may be replaced by any source that provides radiation having a wavelength that is substantially absorbed by blood vessels. The red-light source LDR may be replaced by any source that provides radiation having a wavelength that is not substantially absorbed by blood vessels. It should furthermore be noted that steps may be carried out in an order different from that illustrated in FIGS. 3A, 3B or FIGS. 5A, 5B. Moreover, it is possible to omit certain steps. For example, step ST10-ST13 may be skipped, in which case a positive outcome of step ST8 provides a positive identification.

There are numerous ways of implementing functions by means of items of hardware or software, or both. In this respect, the drawings are very diagrammatic, each representing only one possible embodiment of the invention. Thus, although a drawing shows different functions as different blocks, this by no means excludes that a single item of hardware or software carries out several functions. Nor does it exclude that an assembly of items of hardware or software or both carry out a function.

The remarks made herein before demonstrate that the detailed description, with reference to the drawings, illustrates rather than limits the invention. There are numerous alternatives, which fall within the scope of the appended claims. Any reference sign in a claim should not be construed as limiting the claim. The word "comprising" does not exclude the presence of other elements or steps than those listed in a claim. The word "a" or "an" preceding an element or step does not exclude the presence of a plurality of such elements or steps.

The invention claimed is:

1. A method of identification comprising:
    measuring a surface structure and an inner structure of a body member so as to obtain a surface-structure measurement result and an inner-structure measurement result, the inner structure of the body member being measured by means of a radiation that traverses the body member so as to obtain a transmission image of the body member;
    comparing the surface-structure measurement result with a surface-structure reference result that distinguishes an individual from other individuals;
    comparing the inner-structure measurement result with an inner-structure reference result that is associated with the same individual and that distinguishes the individual from other individuals;
    applying a further radiation to an object that should normally be the body member so as to obtain a verification image, and comparing the verification image with the transmission image of the body member so as to ascertain that the verification image represents the inner structure of the body member less clearly than the transmission image.

2. The method of identification as claimed in claim 1, wherein the surface structure of the body member is measured by the radiation that traverses the body member so that the transmission image comprises features that belong to the surface structure and features that belong to the inner structure of the body member.

3. The method of identification as claimed in claim 2, wherein the method further comprises processing the transmission image so as to distinguish features that belong to the surface structure from features that belong to the inner structure of the body member.

4. The method of identification as claimed in claim 1, wherein the surface structure of the body member is measured by a radiation that is reflected from a surface of the body-member so as to obtain a reflection image.

5. The method of identification as claimed in claim 1, wherein the surface structure comprises a fingerprint.

6. The method of identification as claimed in claim 1, wherein the inner structure comprises a blood-vessel pattern.

7. An identification apparatus comprising:
    a measurement arrangement arranged to measure a surface structure and an inner structure of a body member so as to obtain a surface-structure measurement result and an inner-structure measurement result, the measurement arrangement being arranged to measure the inner structure of the body member by a radiation that traverses the body member so as to obtain a transmission image of the body member, the measurement arrangement being further arranged to apply a further radiation to an object that should normally be the body member so as to obtain a verification image;
    a processor arranged to compare the surface-structure measurement result with an surface-structure reference result that distinguishes an individual from other individuals, and to compare the inner-structure measurement result with an inner-structure reference result that is associated with the same individual and that distinguishes the individual from other individuals, the processor being further arranged to compare the verification image with the transmission image of the body member so as to ascertain that the verification image represents the inner structure of the body member less clearly than the transmission image.

8. An identification system comprising the identification apparatus as claimed in claim 7, and a database that comprises a set of unique characteristics for each individual among a plurality of individuals, the set of unique characteristics comprising a surface-structure reference result relating to a body member of the individual and an inner-structure reference result relating to the body-member.

9. A computer-program product, encoded in a non-transitory computer readable medium, for an identification apparatus, the computer program product comprising a set of instructions that, when loaded into the identification apparatus, causes the identification apparatus to carry out the method as claimed in claim 1.

* * * * *